Sheet 1-2 Sheets.

T. H. Fox,
Water Wheel.

No. 81,618. Patented Sept. 1, 1868.

Witnesses:

Inventor:
Thos. H. Fox
by Munn,

Sheet 2-2 Sheets
T. H. Fox,
Water Wheel,
№ 81,618. Patented Sept. 1, 1868.
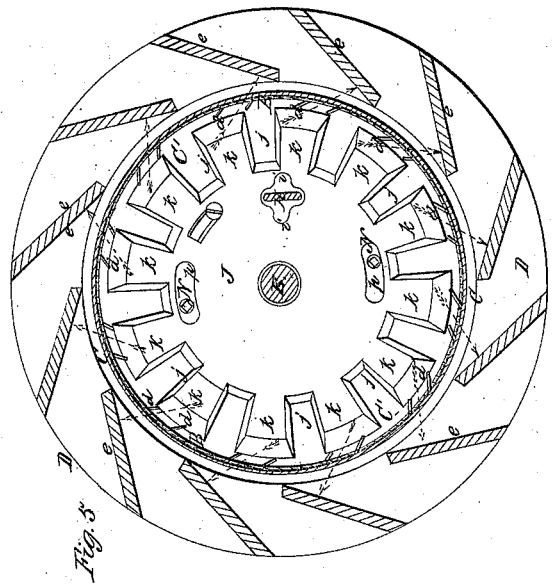
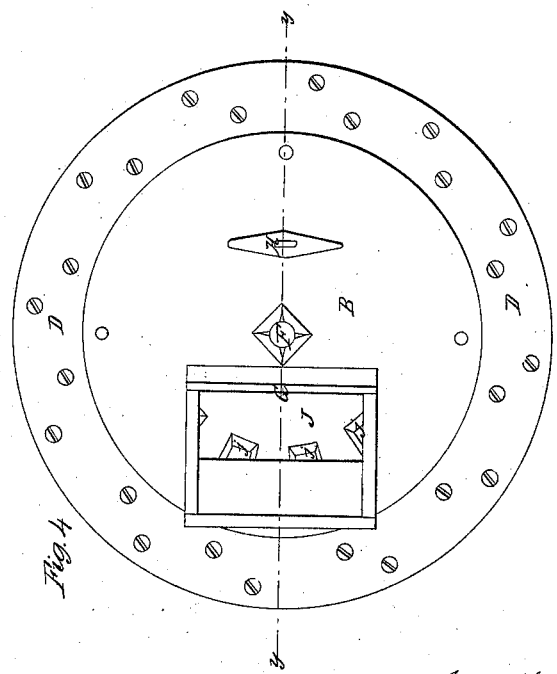
Witnesses:
Inventor:
Thos. H. Fox

United States Patent Office.

THOMAS H. FOX, OF HANOVER, VIRGINIA.

Letters Patent No. 81,618, dated September 1, 1868.

---

IMPROVEMENT IN WATER-WHEELS.

---

The Schedule referred to in these Letters Patent and making part of the same.

---

TO ALL WHOM IT MAY CONCERN:

Be it known that I, THOMAS H. FOX, of Hanover, in the county of Hanover, and State of Virginia, have invented certain new and useful Improvements on Water-Wheels; and I do hereby declare that the following is a full, clear, and exact description thereof, reference being had to the accompanying drawings, making a part of this specification, in which—

Figure 1:
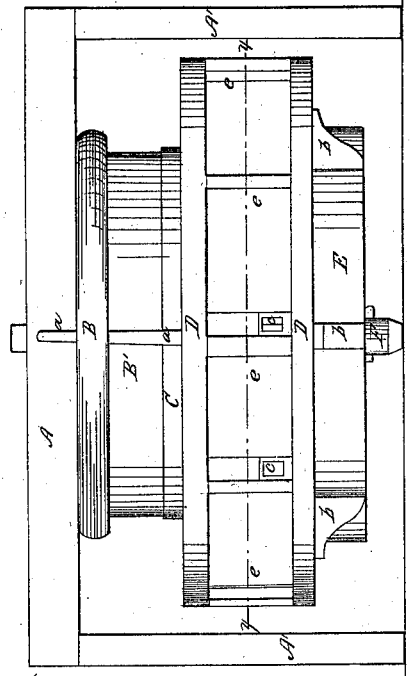

Figure 1, plate 1, is an elevation of the improved water-wheel.

Figure 2:
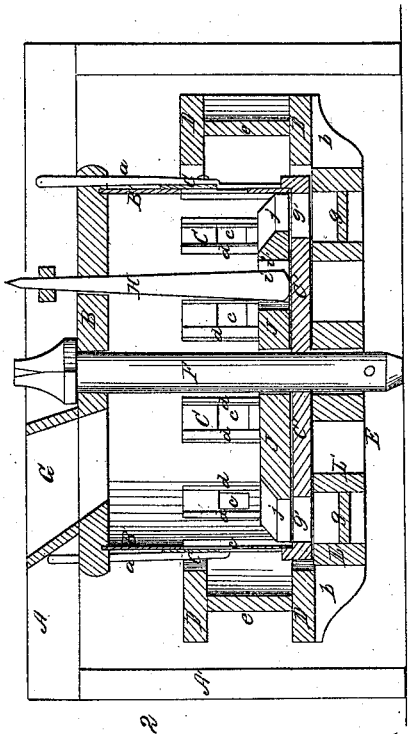

Figure 2, plate 1, is a section through the wheel, taken in the vertical central plane indicated by red line $y\ y$, in fig. 4, plate 2.

Figure 3:
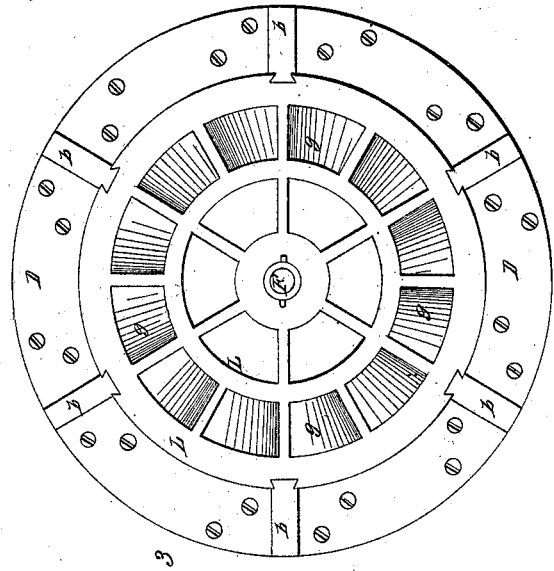

Figure 3, plate 1, is a bottom view.

Figure 4, plate 2, is a top view, with the supporting-frame removed.

Figure 5, plate 2, is a section, taken through fig. 1, in the horizontal plane indicated by red line $x\ x$.

Similar letters of reference indicate corresponding parts in the several figures.

This invention relates to certain novel improvements on that class of water-wheels known as turbine-wheels, that is to say, wheels which are keyed to vertical shafts. It also relates to that class of turbines or horizontal water-wheels which are acted upon by columns of water descending from fore-bays, and flowing outwardly against the floats or buckets of the wheels.

The nature of my invention consists, mainly, in a series of vertical buckets, arranged concentrically and tangentially around a cylindrical penstock, and attached to a central vertical shaft, so as to rotate freely, and in providing the cylindrical penstock with a number of lateral passages, for the purpose of conducting water from it upon the buckets, said passages being made at such angles, with reference to the buckets, as will direct the outflowing streams upon them to the best advantage, and being provided with a vertically-adjustable gate, by means of which the flow of water can be regulated or cut off at pleasure, as will be hereinafter explained.

The invention also consists in supporting a water-wheel, which is arranged to revolve around a cylindrical laterally-discharging penstock, upon another water-wheel, which is arranged beneath the penstock, and which is secured to a vertical central shaft passing up through it, the latter wheel being supplied with water through openings made through the bottom of the penstock, which openings are provided with movable gates, by means of which the flow of water to the bucket can be regulated or cut off at pleasure, as will be hereinafter explained.

The invention further consists in connecting the upper water-wheel, or that which revolves around the penstock, to the circumferential rim of the wheel which rotates beneath the penstock, by means of brackets or their equivalents, which will allow the upper wheel to be disconnected from the lower wheel, when it is desired to run the latter alone, as will be hereinafter explained.

To enable others skilled in the art to understand my invention, I will describe its construction and operation.

In the accompanying drawings, A represents a horizontal framework, which is supported upon vertical walls, A', and adapted for sustaining the water-wheels, the penstock, and their appurtenances. B' represents a cylindrical penstock, which is secured, in any suitable manner, between a circular head, B, and a circular bottom, C', so as to receive water from the fore-bay, and conduct it to the buckets of two water-wheels.

The head, B, is securely bolted to the horizontal frame A, and the bottom, C', may also be secured to said frame by means of vertical suspension-rods, N N, shown in the sectional view, fig. 5. Through this head, B, is an opening, G, which leads to the chute or fore-bay, and conducts water into the penstock, for distribution upon the wheels.

The shaft F is arranged, in a vertical position, in the centre of the penstock, passing through the head and bottom thereof, and being supported on top of the penstock, as shown. To this shaft, beneath the bottom of the penstock, a horizontal water-wheel is suitably secured, so as to run as close as practicable to the bottom, C, without causing undue friction. This wheel is constructed with buckets or floats, $g\ g$, which are inclined from a horizontal plane, and so arranged that water issuing from openings, $g'$, made through the bottom, C', of the penstock will cause the wheel to rotate. These buckets or floats may be curved, angular, flat, or of any other shape which is found to afford the best results from descending streams of water flowing through the passages $g'$. They may be cast with their inner and outer rings, L L', or made separate, and secured between these rings in any suitable manner.

On top of the bottom of the penstock is a circular regulator, J, through which the shaft F passes freely, and in the edge of which spaces $j$ are formed, having their surrounding edges bevelled, as shown in figs. 2 and 5. These spaces are made at regular distances apart, so as to leave radial projections, $k\ k$, corresponding in number to the passages, $g'$, through the bottom, C', of the penstock, which projections are designed to serve as a means for regulating the flow of water through said passages $g'$, or for cutting off the flow entirely. The regulator J is guided by rods N, which pass through oblong slots, $p\ p$, made concentric to the axis of shaft F, and this regulator is adjusted about its axis by means of flattened rod H, the lower end, $i$, of which works in a cross-slot, $i'$, made into or through the regulator, substantially as shown in figs. 2 and 5. The upper end of rod H passes through the head, B, of the penstock, and has a suitable handle upon its upper end. By oscillating rod H, the regulators $k$ can be made to cover the passages $g'$ more or less, according to the amount of water it is desired to supply to the buckets or floats $g$.

At regular intervals apart, around the water-wheel above described, and fitted into dove-tail grooves made vertically into the periphery of the outer ring or rim, L, are a number of brackets, $b\ b$, shown in figs. 1, 2, and 3, which brackets are designed to serve as supports for a water-wheel, which I shall term the upper wheel, and which is arranged concentrically around the cylinder B' of the penstock. The base-ring D of this upper wheel is secured fast to the brackets $b$, and the buckets or floats $e\ e$ are secured between the two rings D D, or may be cast with these rings. This upper wheel, together with its bracket-supports $b\ b$, can be detached from the lower wheel by simply lifting the upper wheel, and, by suitable supports, the latter can be held out of operation.

The buckets of the upper wheel are arranged tangentially to the cylinder B', at equal distances apart, and they may be made flat, curved, angular, or of any other shape which will afford the best results from water flowing against them.

Oblong passages, $c$, are made laterally through the cylinder B', with lips or flanges, $d\ d$, upon their vertical edges, and through these passages water flows upon the buckets or floats $e$, as indicated by the arrows in fig. 5. The flanges $d\ d$ project inwardly, and are adjusted at such angles as will adapt them to serve as guides for directing the outwardly-flowing currents against the surfaces of buckets $e$ in, or nearly in, lines perpendicular to their surfaces.

For regulating, and, when desired, cutting off the flow of water through passages $c\ c$, I employ a cylindrical gate, C, which surrounds the cylinder B', as shown in figs. 1, 2, and 5, and which is vertically adjustable. This gate is suspended by means of vertical rods, $a\ a$, which pass up through the projecting edge of the head, B. By raising or lowering these rods, the gate C can be made to regulate the size, vertically, of all the passages $c$, and, if desirable, these passages may be entirely closed.

The upper ends of rods $a$ may have adjusting-screws applied on them, or, if desirable, these rods may be connected together by a cross, so that they can all be moved together.

From the above description, it will be seen that I employ, for the same penstock, two water-wheels, either one of which can be operated, or, when desirable, both can be operated at the same time. I adapt the lower wheel to serve as a support for the upper wheel, and a means through which the force of this upper wheel is transmitted to the shaft F. I provide for readily throwing the upper wheel out of operation when it is desired to run the lower wheel alone, and, in order to prevent unnecessary draught and friction under these circumstances, I am enabled to readily disconnect the upper wheel from the lower one. I also provide for directing streams of water, from a vertical penstock, against the buckets of the upper wheel at such angles as will afford the best results, and I also provide for regulating the flow of water upon said buckets from passages which are provided with directing-flanges or guides.

Having described my invention, what I claim as new, and desire to secure by Letters Patent, is—

1. A vertical penstock, which is provided with lateral passages through its side, and vertical passages through its bottom, adapted for supplying two water-wheels, arranged and supported substantially as described.

2. The arrangement, consisting of the cylindric penstock B' $d$, frame A A, stay or suspension-rods N N, shaft F, gate C, wheel D D $e$, the said parts being constructed as described, and so combined that the wheel D D $e$ is suspended on its shaft by the top of the penstock, as shown and described.

3. The regulator J, constructed as described, and arranged upon the bottom, C', of the penstock, in combination with passages $g'$, a wheel, L L' $g$, and a wheel, D D $e$, substantially as described.

4. A cylindrical penstock, which is constructed with lateral and vertical passages through it, and a chute, G, leading into its upper end, in combination with two water-wheels and their regulators, arranged to operate substantially as described.

5. The upper revolving water-wheel, connected to and supported by the lower water-wheel and vertical shaft F, said upper wheel being detachable from the lower wheel, substantially as described.

THOMAS H. FOX.

Witnesses:
WALTER A. RICKS,
D. G. BIBB.